United States Patent [19]

Cunningham

[11] Patent Number: 5,790,334
[45] Date of Patent: Aug. 4, 1998

[54] CIRCUIT AND METHOD FOR OPTIMIZING BIAS SUPPLY IN A MAGNETORESISTIVE HEAD BASED ON THE THERMAL PROPERTIES OF THE MR HEAD ITSELF

[75] Inventor: Earl Albert Cunningham, Rochester, Minn.

[73] Assignee: International Business Machines Corporation, Armonk, N.Y.

[21] Appl. No.: 720,550

[22] Filed: Oct. 2, 1996

[51] Int. Cl.$^6$ .................................................. G11B 5/03
[52] U.S. Cl. ..................................... 360/66; 360/113
[58] Field of Search .............................. 360/25, 46, 65, 360/66, 67, 68, 113; 324/207.21, 249, 252

[56] References Cited

U.S. PATENT DOCUMENTS

| | | | |
|---|---|---|---|
| 4,691,259 | 9/1987 | Imakoshi et al. | 360/113 |
| 4,786,993 | 11/1988 | Jove et al. | 360/67 |
| 5,301,080 | 4/1994 | Ottesen et al. | 360/113 |
| 5,309,294 | 5/1994 | Cahalan | 360/66 |
| 5,412,518 | 5/1995 | Christner et al. | 360/66 |

FOREIGN PATENT DOCUMENTS

| | | | |
|---|---|---|---|
| 60-10402 | 1/1985 | Japan | G11B 5/02 |
| 60-98504 | 6/1985 | Japan | G11B 5/02 |
| 60-124005 | 7/1985 | Japan | G11B 5/02 |
| 5-182113 | 7/1993 | Japan | G11B 5/02 |
| 5-325110 | 12/1993 | Japan | G11B 5/02 |
| 6-60307 | 3/1994 | Japan | G11B 5/02 |
| 6-295404 | 10/1994 | Japan | G11B 5/02 |

OTHER PUBLICATIONS

Schwarz, T.A., "Automatic Bias Control for Mr. Heads", *IBM Technical Disclosure Bulletin*, vol. 21, No. 8, Jan. 1979, pp. 3339–3340.

*Primary Examiner*—Paul W. Huber
*Attorney, Agent, or Firm*—Derek P. Martin

[57] ABSTRACT

A method and apparatus adaptively controls the biasing current applied to individual magnetoresistive (MR) heads within a Direct Access Storage Device (DASD) to provide an optimized bias current based on the thermal properties of each MR read head. An optimal bias current is determined by using a ratio of resistances of the MR read head at different bias levels. The use of the resistance ratio allows the bias level to be optimally adjusted for each individual MR read head within a DASD unit based on the physical geometry of the individual MR stripe within the MR read heads. The optimal bias supply enhances MR read head sensitivity, improves the signal-to-noise ratio, and thereby reduces errors in reading data from magnetic storage media within the DASD. The maximum allowable bias current level is controlled so as to preserve the overall life expectancy of the MR heads.

25 Claims, 5 Drawing Sheets

CIRCUIT AND METHOD FOR OPTIMIZING BIAS SUPPLY IN A MAGNETORESISTIVE HEAD BASED ON THE THERMAL PROPERTIES OF THE MR HEAD ITSELF

RELATED APPLICATION

This application is related to a co-pending patent application by Earl A. Cunningham entitled "CIRCUIT AND METHOD FOR OPTIMIZING BIAS SUPPLY IN A MAGNETORESISTIVE HEAD BASED ON TEMPERATURE", Ser. No. 08/717,918, filed Sep. 23, 1996.

BACKGROUND OF THE INVENTION

1. Technical Field

The present invention generally pertains to magnetic storage devices and more particularly to magnetoresistive (MR) transducer head elements.

2. Background Art

Our modern society is heavily dependant upon computer systems for everyday activity. Computers are found in our homes, in business offices, and in most production and manufacturing environments. Most computer systems are controlled by a central processing unit (CPU) and have various types of memory storage components which can be used by the CPU to operate and perform the various functions for which it has been programmed.

Traditionally, computer system memory storage components have been classified as either main memory (primary or main storage) or secondary memory (secondary storage). Information in main memory may be accessed directly by the CPU. Information in secondary memory, however, must be loaded into main memory for the CPU to access this information. Main memory is typically relatively small, fast, and expensive when compared to secondary storage components. As a result, computer systems typically rely on large quantities of secondary storage to economically hold a large amount of information that the CPU may need to access.

Secondary storage is often provided in the form of a Direct Access Storage Device (DASD). Typical examples of DASDs would hard disk drives, tape drive subsystems, and Compact Disk Read Only Memory (CD-ROM) drive units. Even entry-level home computer systems will have approximately 850 megabytes to two gigabytes of secondary storage, usually in the form of a single hard disk drive unit. Many of the newer home computer systems will also include a CD-ROM drive as well. Computer systems used in larger business and commercial operations often utilize multiple DASD units, with hard disk drives and tape backup systems being very common.

A typical hard disk drive unit is composed of multiple circular storage platters mounted inside a housing. The storage platters have a coating of magnetic material with small regions that define binary digits (or bits) that may be polarized in either of two directions. These magnetic storage platters are used by the computer system to store information that may be needed by the CPU. In order to store data on the platters, small read/write heads are placed in close proximity to the surface of the storage platters while the platters turn. During a write operation, the write heads change the magnetic characteristics of the surface of the platter, thereby storing data received from the CPU on the platter. During a read operation, the read heads sense the differences in the magnetic characteristics of the surface of the platter and transmit the data read from the platter to the CPU. A tape drive operates in a very similar manner but the storage medium takes the form of a magnetic tape instead of a platter.

The read heads of a DASD unit are frequently manufactured from magnetoresistive (MR) transducer elements. MR read head performance is significantly affected by several factors, most notably, ambient temperature and bias current. The effects of ambient temperature and bias current will be considered individually.

For the purposes of this discussion, ambient temperature is to be considered the temperature inside the DASD enclosure that houses the MR transducer heads and magnetic media (e.g., platters in a hard disk drive). Ambient temperature has a measurable effect on the performance of the DASD. When the ambient temperature decreases, the performance of the DASD degrades and error rates increase. While all of the reasons behind this phenomenon are not completely understood, the effect is most likely due to a combination of multiple factors. These factors include increases in the distance between the MR transducer heads and the surface of the storage media, higher levels of media noise, and poorer signal recording which, in turn, decreases the signal amplitude.

The effects of bias current on MR transducer head performance are more directly measurable. In general, the sensitivity of an MR head depends on many factors. One of the most significant factors is the bias current provided to the MR head. The ability to read a signal from the storage media is, in part, a function of the amount of bias current supplied to the MR head. Signal sensitivity can be increased by increasing the amount of bias current supplied to the MR head. Therefore, increased bias current will generally produce an improved signal-to-noise ratio and will therefore result in lower error rates. However, simply increasing the bias current is not a complete solution because excessive current can significantly shorten the useful life span of the MR read head.

Bias current can adversely affect MR read head life in two different ways. First, application of bias current in excessive quantities can cause the MR element to overheat. If the current density reaches a high enough level, the MR element will actually burn out. This type of catastrophic failure is typically avoided by selecting a bias current level for the MR read head that will keep the MR read head from burning out over the entire operating temperature range of the MR read head.

Catastrophic failure, however, is not the most common cause of MR read head failure. The most common cause of MR read head failure is a phenomenon known as electromigration. Constant exposure to even normal operating levels of bias current will, over an extended period of time, change the molecular structure of the MR read head, thereby degrading the magnetic sensing capability of the MR read head.

In existing DASD units, the MR heads are typically characterized to determine the range of their operating characteristics over temperature and bias current variations. The performance of MR heads fabricated on a given fabrication line may vary considerably due to process variations that cause different geometric features on the heads. To assure that even the MR read head with the worst-case geometric tolerances will have at least a minimum desired lifetime, a bias current is selected for all of the MR read heads that will keep the temperature of all MR read heads below predetermined threshold levels. This pessimistic approach provides the desired minimum lifetime for the DASD unit, but does so at the expense of driving all heads with a bias current that is selected based on the worst-case. Of course, MR heads that are in the nominal range of manufacturing tolerances could be driven with a higher bias current to boost their performance without exceeding the relevant temperature thresholds, but this higher bias current would significantly shorten the life of MR heads at the worst-case of expected manufacturing variations in the MR heads. Empirical results show that 155° C. is the approximate maximum operational temperature that an MR read head can be operated at without causing premature failure. As a result, the maximum bias current for all heads is typically set to equal the maximum bias current for the worst-case head. Without new ways to provide optimal levels of bias current to MR read heads, the overall performance of DASD storage devices will be limited.

DISCLOSURE OF INVENTION

According to the present invention, a method and circuit adaptively controls the bias supply source for MR read heads within a DASD unit to provide an optimized bias supply source for each individual MR read head that is determined by the resistance of the individual MR read head. A resistance ratio for an MR read head is determined by measuring the resistance of the MR read head at a low level of bias and measuring the resistance of the MR read head at a relatively higher level of bias. The actual bias supplied to the MR read head is adjusted to an optimum level as determined by the ratio of the two resistances. The empirically determined, theoretically desired, ideal ratio is 1.138, which represents a 13.8% increase in resistance at the high bias level compared to the low bias level, if the low bias level is low enough to ensure that heating due to the bias is negligible. When other than negligible heating occurs at the low bias level, the ideal resistance ratio will be somewhat smaller but may still be calculated based on the relative heating that occurs at each bias level.

Generally, the optimal bias supply level will be determined and set at the time the DASD unit is manufactured. Alternatively, with an appropriately designed DASD unit, the bias supply circuit can be recalibrated and the bias supply level reset anytime, such as when the DASD unit is powered up.

The method and circuit seek to increase the bias supply as much as possible for a given MR read head considering the physical geometry of the MR read head. The maximum possible bias current is supplied in order to maximize MR read head performance while simultaneously maintaining the bias current at a level low enough to not arbitrarily and unnecessarily degrade the overall life expectancy of the MR read head.

According to the present invention, bias current for each MR read head is optimized for the physical geometry of the individual head. The present invention, therefore, enhances the MR read head sensitivity of each MR read head within the DASD unit, improves the signal-to-noise ratio, and thereby reduces errors in reading data from the magnetic storage media. The maximum allowable bias current level is not exceeded in order to preserve the overall life expectancy of each MR head. The present invention significantly improves the sensitivity and performance of MR read heads in a DASD unit.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The Overview Section immediately below is intended to provide an introductory explanation of basic MR read head fundamentals for individuals who need additional background in this area. Those who are skilled in the art may wish to skip this section and begin with the Detailed Description Section instead.

OVERVIEW

An MR read head has a center portion known as an MR stripe. The MR stripe is the portion of the MR read head that actually senses the magnetic characteristics of the magnetic media in a DASD (such as storage platters), thereby reading the data recorded on the magnetic media. The effect that the ambient temperature and the bias current will have on a given MR read head is integrally tied to the physical geometry of the MR stripe. The typical dimensions of an MR stripe are becoming smaller in order to achieve a higher density of data recorded on the media. In addition, the width and length of a bit region on the media are also shrinking, resulting in smaller signal levels while reading the recorded data. The intrinsic loss of signal level with smaller sensors must be compensated for by using a combination of magnetic storage media improvements, reductions in the distance between the MR read heads and the surface of the storage media, more sophisticated signal processing techniques, and other MR read head technology advances. However, the rate of improving the range of geometric variability in MR stripe is slower than the rate of other improvements. As a result, physical variations in the geometries of the MR stripe are becoming more of a problem.

In the design of a typical MR read head, the tolerances on the MR stripe height represent a ±33% change, which, with respect to the ratio of the highest stripe height to the lowest stripe height, represents a 2:1 ratio. Further, the tolerance of the width of the MR stripe (length in the direction of current flow) is ±20% and the tolerance of the MR stripe thickness is ±10%. If each of these individual measurements are considered as independent variations, the statistical total additive variation in the resistance of the typical MR stripe due to physical geometry is approximately ±40%, or a high to low ratio of 2.33:1.

Generally, the amount of bias current supplied to all of the MR read heads within a DASD is identical. Due to the geometric variability of the MR stripes discussed above, this fixed-level biasing method can cause a significant difference in the amount of power dissipation for different heads within a DASD. Further, current density varies significantly within each MR stripe because the cross-sectional area for the bias current (stripe height by thickness) also varies by a large amount. In addition, the read gap length, which is a measure of the amount of glass located on each side of the MR element, is dominated by the glass on each side of the MR element, has a tolerance of approximately ±10%. This figure translates directly to a ±10% tolerance in the thermal resistance per square micron. Therefore, this physical variation also limits the maximum allowable bias level, since the ability to dissipate power is related to the read gap length and must also be considered.

In a typical disk drive unit, MR read head life is inversely related to the cube of the current density, and exponentially to temperature (with higher temperatures being more detrimental than lower temperatures). Given the differences in the MR stripe geometries, there tends to be a large variation in the resistance and current density in the different MR stripes. Relatively thin MR stripes that have low heights will have correspondingly higher resistances and higher current densities. This, in turn, results in higher levels of power dissipation. The resulting increased power dissipation causes significantly more temperature rise than would be associated with a higher and thicker MR stripe. Temperature and current density effectively compound and thereby decrease the life expectancy for an MR head with a thinner, lower MR stripe when compared to MR read heads that have a thicker, higher MR stripe.

The overall temperature of an MR stripe is a function of the ambient temperature of the air surrounding the MR stripe, the heat generated by the current passing through the MR stripe, and the thermal resistance between the two. Heat generated within the MR stripe is dissipated through one or more thermal paths to the environment surrounding the MR read head. The heat generated in the MR stripe, the thermal resistance, and the ambient temperature are all selected to keep the temperature of the MR stripe below some predetermined maximum temperature threshold.

The maximum temperature threshold is then selected to assure that all MR heads within manufacturing tolerances will operate for an acceptable period of time after accounting for the effects of electromigration. The maximum allowable current for all of the MR read heads will be determined by the worst-case scenario. This means that many MR read heads within a given DASD will potentially be capable of withstanding bias current in excess of the supplied level. The maximum absolute temperature of each MR stripe controls the electromigration for that MR stripe. In other words, it is the combination of the ambient temperature and the temperature rise associated with the current passing through the stripe that shortens the life of the MR stripe.

Another consideration is that all of the factors listed above that increase MR stripe resistance also increase the signal sensitivity when all of the MR read heads are supplied at a fixed level of bias current. This means that the best signal-to-noise ratio will typically be found in MR heads that have MR stripes with the highest resistance. Thus, MR heads with low, thin MR stripes produce good signal-to-noise ratios, while MR heads with high, thick MR stripes produce poorer signal-to-noise ratios. Typically, for a given bias current, the MR head with the shorter life expectancy will also be more sensitive to the signal. Since there are multiple MR read heads with different geometries in a given DASD unit, the bias current will affect each of the MR read heads differently and each MR read head will have a different life expectancy and a different signal sensitivity.

Therefore, when selecting the bias current for a DASD unit, the design engineer has to make a trade off between increasing MR head signal sensitivity and decreasing product life. Since the geometries of the MR stripes within the DASD unit varies greatly, a given bias current may shorten the life span of some of the MR stripes unnecessarily and may also cause certain MR stripes to perform at less than optimal sensitivity levels. A fixed-level bias current must necessarily be a compromise between good signal-to-noise ratio for most of the MR transducer heads and shorter life expectancy for some of the MR transducer heads.

A partial solution to the large variation in MR head performance due to the physical geometric variability in the MR stripe is presented in U.S. Pat. No. 5,412,518, "INDIVIDUAL MR TRANSDUCER HEAD/DISK/CHANNEL ADAPTIVE BIAS CURRENT SYSTEM," issued to Christner, et al., and assigned to IBM. This patent discloses a method for biasing an MR read head that tends to adjust the bias supply according to variations in MR stripe height. While this solution provides for driving the MR heads at more optimum values of bias current, it does not directly address the other variations in MR stripe physical geometry.

It should be noted that the bias current for an MR read head can be provided in different ways. For example, a current source may be used to bias the MR read head. Alternatively, a voltage source may be provided and used to bias the MR read head. In conjunction with the present invention, whenever a bias supply source or bias current supply is referenced, it should be construed to include any method known in art for supplying a bias current to an MR read head.

The tradeoff for selecting the bias level for a DASD is that higher bias currents have a tendency to shorten the life of the MR read head, ultimately leading to device failure. The goal is to provide the highest possible bias current for each of the MR read heads while maintaining an acceptable operating lifespan for all of the MR read heads in a DASD.

DETAILED DESCRIPTION

An optimal MR read head bias current is determined by calculating a resistance ratio, using the change in resistance in the MR read head due to heating in the MR read head at different levels of bias current. The bias current supplied to each individual MR read head within the DASD unit is then selected to provide the maximum allowable bias level based on the resistance ratio. Supplying an optimal bias current enhances MR read head sensitivity, improves the signal-to-noise ratio, and thereby reduces errors in reading data from the magnetic storage media. The maximum allowable bias current level is determined so as to preserve the overall life of each individual MR head.

As described above, the lifetime of an MR head is integrally tied to the temperature of the MR head. It is therefore very important to maintain the temperature of the MR read head within rated limits. While it is possible to directly monitor the temperature of the MR read head, this would require the addition of elements or components not currently found in the typical DASD. Alternatively, the temperature of the MR read head can be estimated. One method of estimating the MR read head temperature is by using the resistance ratio. The resistance ratio can then be used to approximate the temperature rise of the MR element and the actual temperature of the MR read head. Using this information, the bias level is set as high as possible to increase performance while not exceeding the maximum rated temperature limits so as to preserve the expected lifetime of the MR read head.

The temperature rise of the MR element can be inferred by using the known temperature coefficient of the MR element (0.23% change in resistance per degree C.), and the bias can be selected to produce the maximum allowable absolute temperature in the MR element based on lifetime/ performance criteria. It is not the absolute value of the resistance itself that is important but the ratio of the resistance of the MR element at a low bias level when compared to the resistance of the MR element at a relatively higher bias level. Since it is the ratio of the two resistances that is used to approximate the actual temperature rise, variations between the design or rated bias levels and the actual supplied bias levels are not significant factors. In addition, at no time is the supplied bias level allowed to exceed the maximum allowable bias level for the MR read heads.

Further, the method of the present invention takes into account the total physical geometric variability of different MR read head elements. Since the resistance ratio is calculated by comparing the resistance of the same MR read head at different bias levels, the physical geometry of each MR read head will determine the resistance ratio for that specific MR read head. Therefore, the bias level can be optimally tailored to the specific physical geometry of a given MR read head.

It should be noted that although the description of the MR bias supply source circuit for the MR element shown in the figures is described as current source, a suitable bias circuit may also include an adjustable voltage source, or another circuit of some non-zero and finite impedance, such as a resistor and a voltage source. The current source is one example of many suitable bias supply circuits within the scope of the present invention and should not be construed so as to limit the invention in any way. While bias current supply sources are well known and widely implemented, alternative methods of designing appropriate bias supply sources are well known to those skilled in the art.

Figure 1:
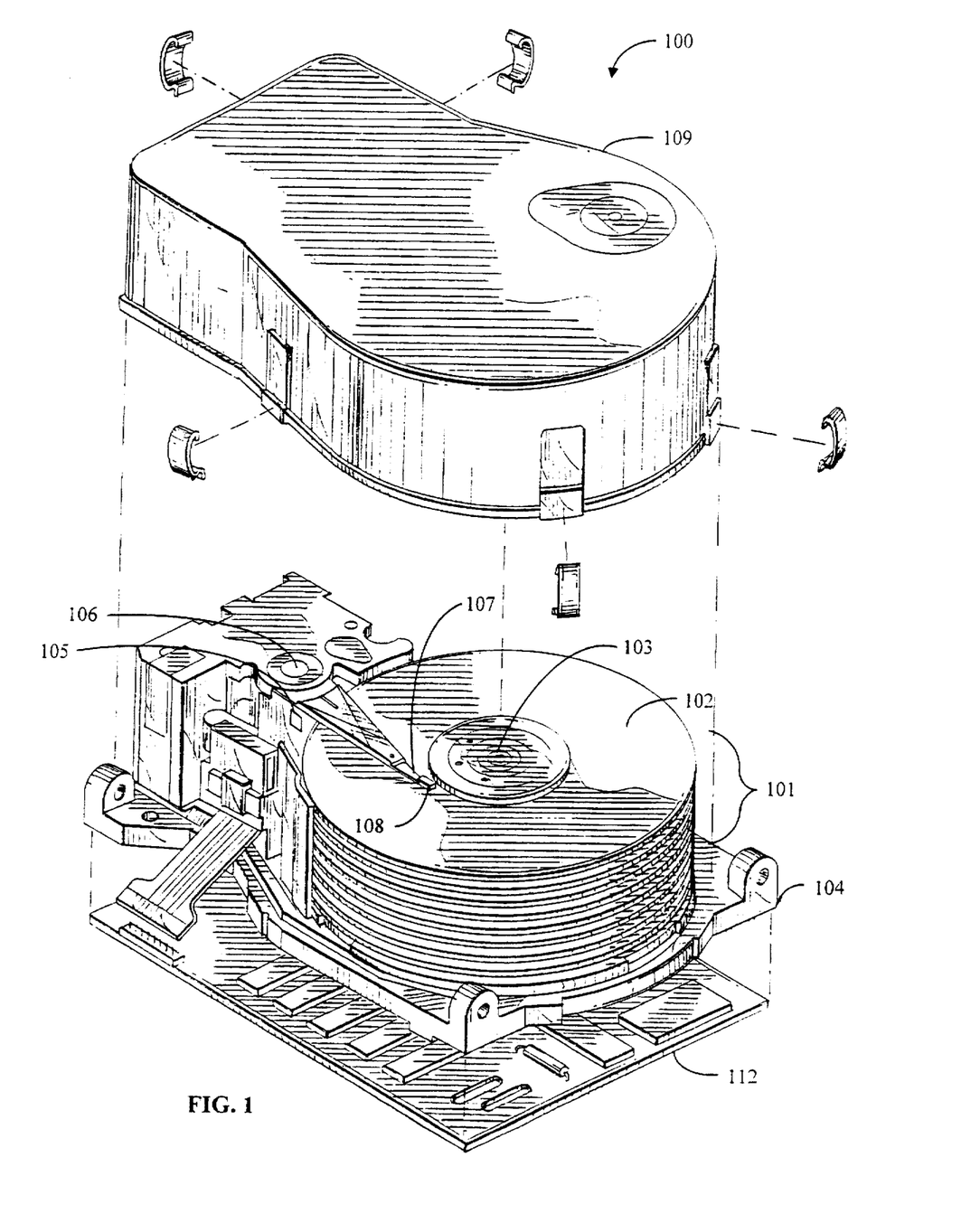
FIG. 1 is a perspective view of a DASD utilizing a circuit according to a preferred embodiment of the present invention.

Referring now to FIG. 1, a magnetic disk drive DASD 100 according to a preferred embodiment of the present invention includes: a plurality of disks 101 with magnetic recording surfaces 102; a hub or spindle 103; a base 104; a bias supply source control circuit 105; a shaft 106; a plurality of head suspension assemblies 107; a plurality of MR read heads 108; a cover 109; and a circuit card 112. Bias supply source control circuit 105 is any circuit or apparatus that is capable of altering and setting the amount of bias supplied to MR read heads 108 based on the resistance of MR read heads 108. Regardless of where bias supply source control circuit 105 is located or how it measures resistance, bias supply source control circuit 105 allows a determination of MR read head bias supply for each MR read head 108 based on the resistance of each individual MR read head 108.

The amount of bias to be supplied to MR read heads 108 is determined by bias supply source control circuit 105. When the resistance ratio is below some desired ideal ratio, then the amount of bias supplied to MR read heads 108 is increased in order to increase the sensitivity of MR heads 108, thereby increasing the signal-to-noise ratio and improving the performance of DASD 100.

Figure 2:
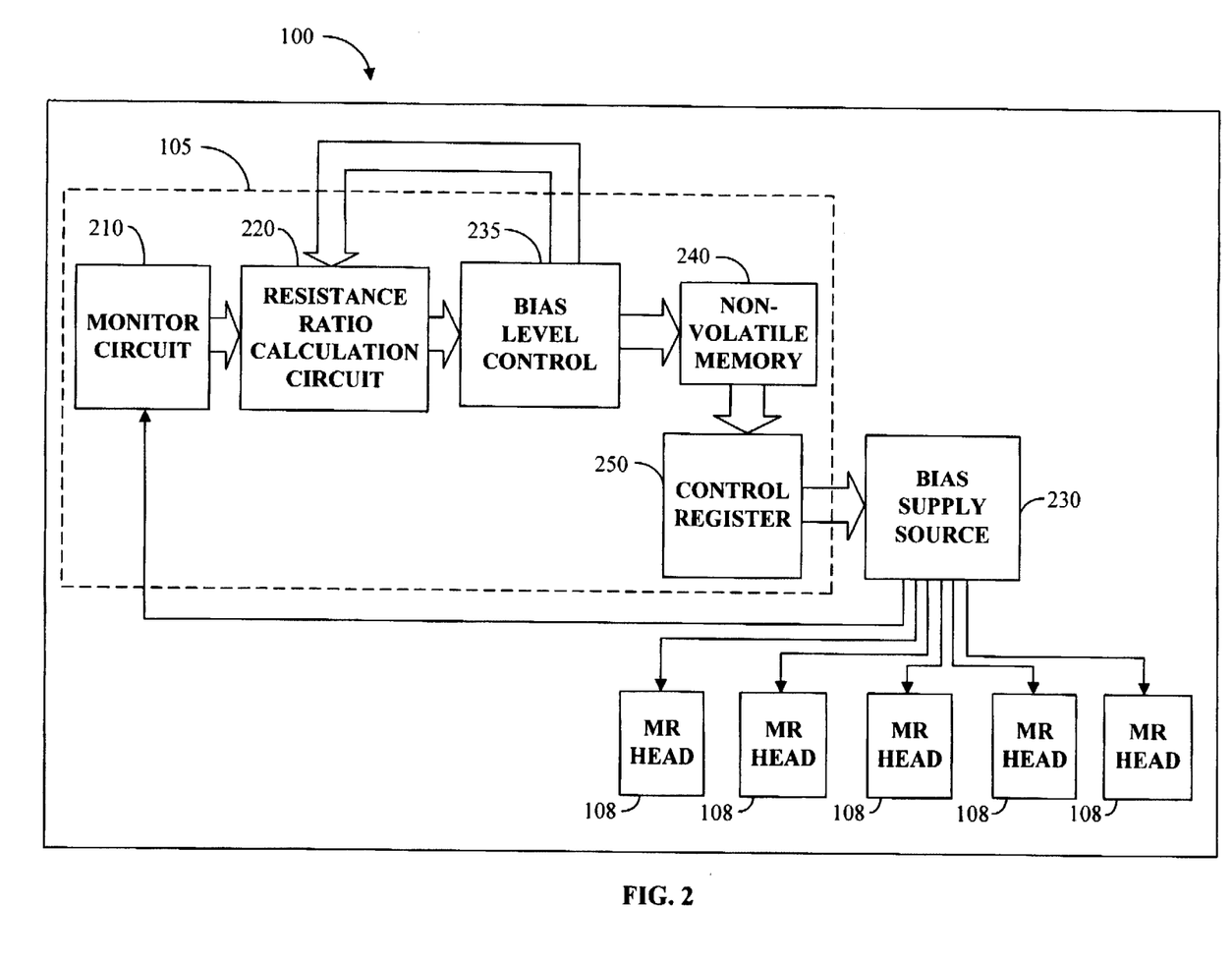
FIG. 2 is a block diagram of a DASD with a circuit for controlling the variable bias supply source of an MR head according to a preferred embodiment of the invention.

Referring now to FIG. 2, DASD 100 according to a preferred embodiment of the present invention includes: bias supply source control circuit 105; a plurality of MR read heads 108; a monitor circuit 210; a resistance ratio calculation circuit 220; a bias supply source 230; a bias level control 235; non-volatile memory 240; and a control register 250. Monitor circuit 210 is any apparatus which is capable of monitoring the operational voltage or current levels for MR read heads 108 within a DASD unit.

For example, in a typical DASD unit, if bias supply source 230 is a current source, the voltage across the MR element can be monitored by monitor circuit 210. If bias supply source 230 is an adjustable voltage source, whenever the voltage is adjusted the resulting current supplied to MR read heads 108 can be monitored by monitor circuit 210. Some existing DASD units presently manufactured have these monitoring capabilities and it is contemplated that further design enhancements will include one or both types of monitoring capabilities for DASD units that presently lack them. In addition, test equipment in a laboratory or factory environment can function as monitor circuit 210. Regardless of where monitor circuit 210 is located or how it monitors voltage and current, monitor circuit 210 allows for a determination of the voltage/current (VI) characteristics associated with each MR head 108.

Resistance ratio calculation circuit 220 uses the current and voltage levels provided by bias supply source 230 and monitor circuit 210 respectively to determine the resistance of the individual MR read heads 108 at various bias levels. First, bias level control 235 is set to a very low bias level. The level set on bias level control 235 is a digital value that is stored in non-volatile memory 240. The contents of non-volatile memory 240 are stored in control register 250, which drives this digital value to bias supply source 230. Bias supply source 230 supplies a bias output that is a function of the input value from control register 250. Resistance ratio calculation circuit 220 uses the bias level set on bias level control 235 and the input from monitor circuit 210 to determine the resistance of MR head 108 at the low bias level. Next bias level control is set to a relatively higher bias level. Resistance ratio calculation circuit uses the higher bias level and the input from monitor circuit 210 to determine the resistance of MR head 108 at this relatively higher bias level. Then, the ratio of the resistance of MR head 108 at the higher bias level compared to the resistance of MR head 108 at the lower bias level is calculated. The actual resistance ratio is compared to the desired resistance ratio and, if necessary adjustments to the bias level are made. This process is repeated until the resistance ratio is as close as possible to the desired resistance ratio and the correct bias level can be determined. The resistance ratio is used to set bias control level 235 to an appropriate value that results in the desired bias being supplied by bias supply source 230.

The amount of bias supplied by bias supply source 230 to each of the individual MR read heads 108 is based on the resistance ratio of each of the individual MR read heads 108 as calculated by resistance ratio calculation circuit 220. The resistance ratio serves as an approximation of the temperature rise of MR read heads 108. By selecting the bias supply level that results in a resistance ratio that is as close as possible to the ideal resistance ratio, MR read heads 108 are operated at the maximum level of bias without causing damage due to excessive temperatures. This increases MR read head performance while simultaneously preserving the desired lifespan of MR read heads 108.

The empirically determined ideal resistance ratio to model the maximum allowable temperature rise in MR read heads 108 is 1.138, if the low bias level is sufficiently low enough to produce negligible heating in MR read head 108. For cases of other than negligible heating, the ideal resistance ratio will be reduced by the heating factor for the lower bias level. This ideal resistance ratio (1.138) has been empirically determined for a certain type of DASD which is currently being manufactured. This ideal resistance ratio will be somewhat different for each type or model of DASD unit manufactured and can be determined in accordance with the methods disclosed in the present invention. When the resistance ratio calculated by resistance ratio calculation circuit 220 is lower than the ideal resistance ratio, then the amount of bias supplied by bias supply source 230 is increased by setting bias level control 235 to a new value in order to increase the sensitivity of MR read heads 108, thereby increasing the signal-to-noise ratio. Correspondingly, when the resistance ratio calculated by resistance ratio calculation circuit 220 is above the ideal resistance ratio, the amount of bias supplied by bias supply source 230 should be decreased in order to maintain at least the minimum desired lifespan of MR read heads 108. As described above, bias level control 235 will determine the actual bias level supplied to MR read heads 108 by bias supply source 230. The bias level value is stored in non-volatile memory 240. This bias level value is then loaded into control register 250 whenever DASD 100 is powered up. Bias level control 235 is used to control the bias level supplied to MR read heads 108 by bias supply source 230. Bias supply source control circuit 105 provides a feed-back mechanism for the various DASD components so that the optimal bias level can be determined and set without any human intervention. As previously indicated, bias supply source control circuit 105 may be a test circuit used to calibrate the bias levels for DASD 100 at the time of manufacture. Alternatively, bias supply source control circuit 105 can be located within DASD 100 and may be used to re-calibrate the bias levels each time DASD 100 is powered on.

It should be noted that the ideal resistance ratio is determined empirically and the resistance ratio of 1.138, which is used for purposes of illustration, is not a limitation of the invention. The invention expressly includes any circuit and method that determines bias level from a resistance ratio of the specific MR head, regardless of the desired or optimal resistance ratio. The actual resistance ratio selected would depend on design choice, desired performance criteria, desired lifespan of the DASD unit, the actual physical characteristics of the individual MR read heads, and other pertinent factors. It is also anticipated that further advances in MR transducer head technology will alter the theoretical ideal ratio.

Figure 3:
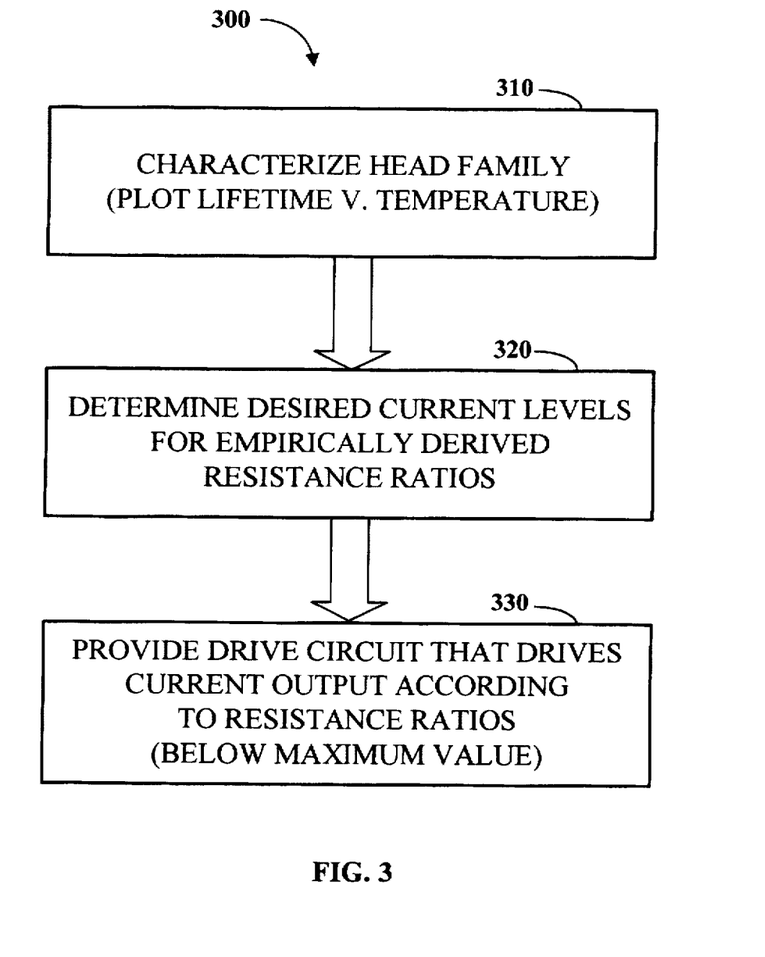
FIG. 3 is a flow chart describing a preferred embodiment of the method of the present invention.

Referring now to FIG. 3, method 300 begins by characterizing the physical properties for the head family (step 310). This characterization includes deriving a plot of head lifetime vs. temperature for the MR stripe. This characterization may further include a determination of head lifetime vs. ambient temperature. Next, based on the results obtained in step 310, the desired bias current levels can be determined for the possible resistance ratios throughout the range of possible operating temperatures (step 320). Finally, once the desired current levels have been established, appropriate circuits can be designed and provided to supply the desired bias current for the actual resistance ratios (step 330).

Figure 4:
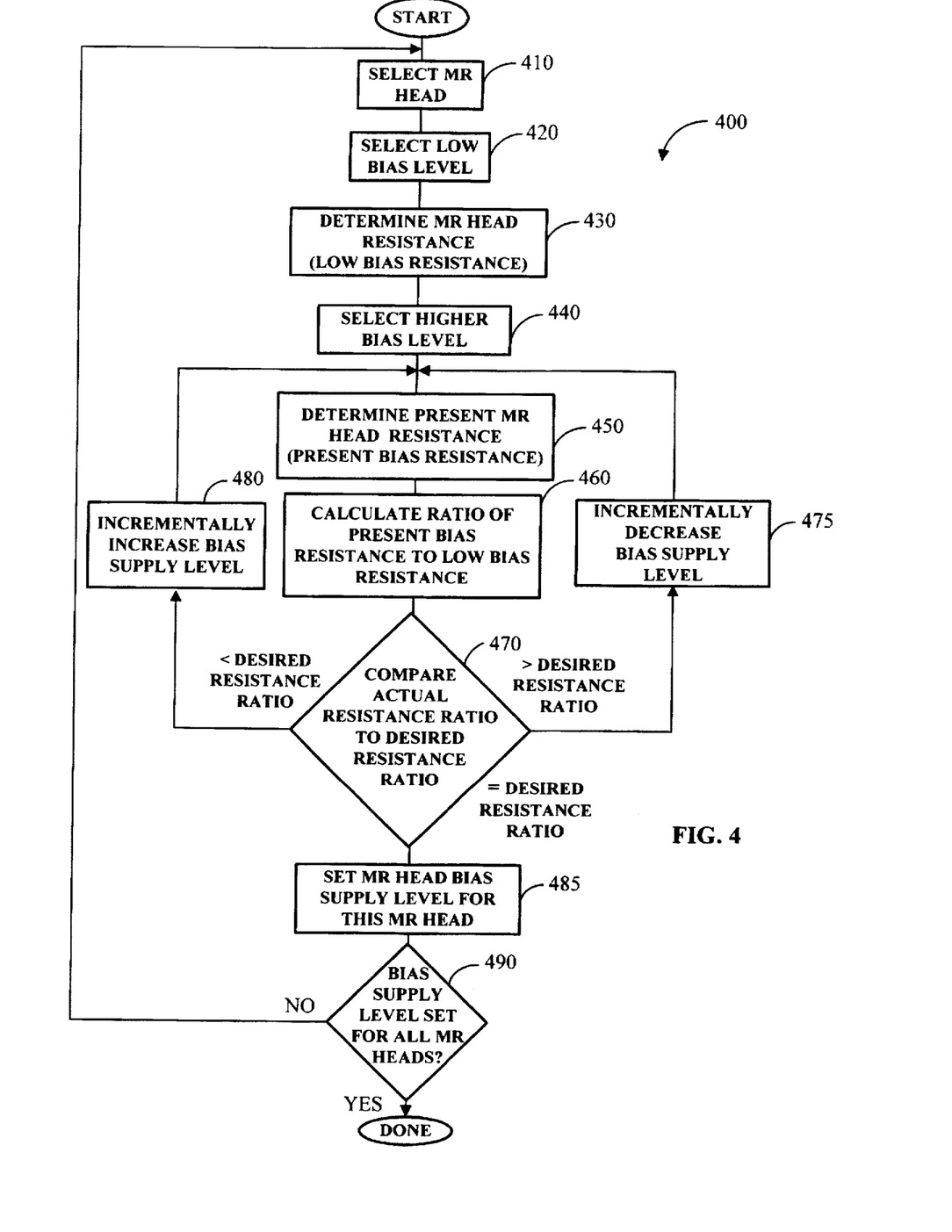
FIG. 4 is a flowchart that shows the steps of providing a continually variable optimal bias supply according to the present invention.

Referring now to FIG. 4, a method 400 for providing a continuously variable bias current includes the following steps. First, an MR head is selected (step 410) and a low bias supply level is selected (step 420). After setting the bias level to the low level, the resistance of the MR head element at the low bias supply level is determined (step 430). Then a relatively higher bias supply level is selected (step 440) and the resistance of the MR head element at the higher bias supply level (step 450) is determined. Using the resistance ratio of the MR head at the higher bias supply level compared to the lower bias supply level, the resistance ratio is calculated (step 460). This actual resistance ratio is compared to the desired resistance ratio (step 470). The method then provides alternative steps. If the actual resistance ratio is equal to the desired resistance ratio, the bias level is not changed, but the bias level is set (step 485). If, however, the actual resistance ratio is lower than the desired resistance ratio, the bias current is incrementally increased (step 480). Alternatively, if the actual resistance ratio is greater than the desired resistance ratio, the bias supply level is decreased (step 475). In all cases, the method returns to step 450 for making additional necessary adjustments until the correct bias supply level is determined (step 485). This overall process is repeated until the bias supply level has been set for all MR heads (step 490). This method contemplates a feed-back loop for finding the optimal level of bias current, thereby maximizing performance of the MR head without unnecessarily compromising MR head life. Obviously, there are certain limitations in the physical hardware used to select and set the bias level that will have an impact on the implementation of the invention. For example, at some point in the process of setting the bias level, the resistance ratio may be lower than desired and method 400 would, therefore, increase the bias level by setting the bias supply source to the next higher increment (step 480). However, when the new resistance ratio at the higher bias level is calculated, it may be too high. Method 400 would, therefore, decrease the bias supply level by setting the bias supply source to the next lower increment (step 475). This process of switching the bias supply level between the higher bias level and lower bias level could, theoretically, continue indefinitely. This problem can be avoided by simply adapting the method to the specific hardware of the DASD and by always selecting the final bias supply level to be the lower of the two levels if this type of conflict occurs. If the DASD had a bias supply source with enough incremental bias levels to choose from, this problem should not occur.

Figure 5:
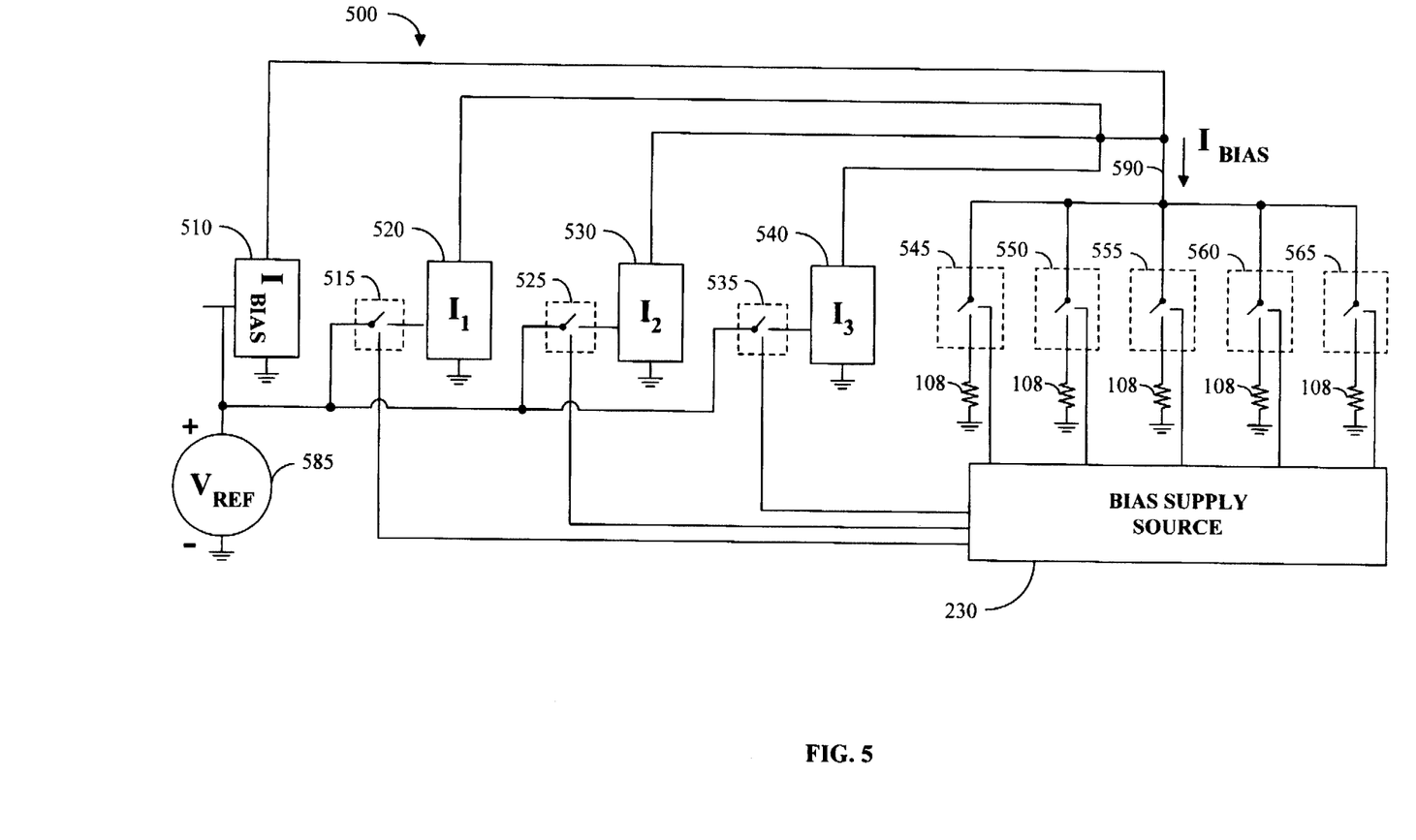
FIG. 5 is a circuit diagram that illustrates a preferred embodiment of a circuit for providing a variable quantized bias current to an MR head.

Referring now to FIG. 5, a circuit 500 for providing a quantized variable bias current to MR transducer heads 108 according to a preferred embodiment of the present invention includes: a bias supply source 230 adapted to supply a current; a base current, $I_{BASE}$ 510; incremental input currents $I_1$ 520, $I_2$ 530, $I_3$ 540; a bias current output, $I_{BIAS}$ 590; a reference voltage 585; and transistor switches 515, 525, 535, 545, 550, 555, 560, 565. The level of bias current to be supplied to each of MR heads 108 by setting bias supply source 230 to an appropriate control value is determined based upon the resistance ratio in a given MR transducer head 108. Input currents $I_{BASE}$ 510, $I_1$ 520, $I_2$ 530, and $I_3$ 540 are combined in a binary fashion so that bias supply source 230 can output binary control signals to set the desired level of variable current $I_{BIAS}$ 590. Transistor switches 545, 550, 555, 560, and 565 are used to select which one of MR transducer heads 108 is to be biased. By closing the appropriate switch which activates a corresponding MR transducer head, any one of MR transducer heads 108 can be accessed. Transistor switches 515, 525, and 535 are used to adjust the amount of bias current that will be supplied to each of the selected MR transducer heads 108.

With circuit 500 adapted for supplying a bias current to MR transducer heads 108, voltage monitor circuit 210 (not shown) would monitor the voltage across selected MR transducer head 108 by monitoring the amount of voltage between a point in the circuit that approximates voltage on MR transducer head 108 (such as where $I_{BIAS}$ 590 is connected to transistor switches 545, 550, 555, 560, and 565) and a ground point (such as the reference ground associated with reference voltage 585). Using this circuit, $I_{BIAS}$ 590 can be adjusted based on the resistance ratio of a given MR transducer head 108 to achieve a more optimal bias level.

For purposes of illustration, assume that $I_{BASE}$ 510 is equal to 5mA, $I_1$ 520 is equal to 1.25 mA, $I_2$ 530 is equal to 2.5 mA, and $I_3$ 540 is equal to 5 mA. Further assume that transistor switches 515, 525, and 535 are all initially open. To provide $I_{BIAS}$ 590 at an output level of 6.25 mA, bias supply source 230 will close transistor switch 515 in order to combine input currents $I_{BASE}$ 510 and $I_1$ 520. Similarly, to provide $I_{BIAS}$ 590 at an output level of 7.5 mA, bias supply source 230 will close transistor switch 525 in order to combine input currents $I_{BASE}$ 510 and $I_2$ 530. Similarly, to provide $I_{BIAS}$ 590 at an output level of 8.75 mA, bias supply source 230 will close transistor switches 515 and 525 to combine input currents $I_{BASE}$ 510, $I_1$ 520, and $I_2$ 530. By logical extension, additional levels of $I_{BIAS}$ 590 can be supplied by using appropriate combinations of the input currents. With the circuit and range of values specified for the input currents as described in FIG. 5, $I_{BIAS}$ 590 can be supplied in 1.25 mA increments at any desired level between 5 mA to 13.75 mA.

This specific example is provided to demonstrate the application of the present invention to a currently manufactured DASD unit that varies the bias current to each MR read head based on the physical dimensions of the MR stripe on each head, as disclosed in U.S. Pat. No. 5,412,518. The quantized current capabilities described above are already present and, therefore, extensive redesign of the DASD unit is not necessary to implement the invention. The wide range of selectable current values are used primarily to adjust the bias current to account for the variability of MR stripe geometries within a DASD unit. However, with the present invention, the geometric variations for MR stripe heights and the other geometric variations in the individual MR elements such as MR stripe width and MR stripe length are accounted for as well. Therefore, the present invention allows most MR heads in DASD 100 to be biased at higher levels than with previously used methods. Additional implications and adaptations of the present invention are contemplated and further described below.

If the present invention is combined with the invention disclosed in the related co-pending patent application, the optimum bias supply can be provided for each individual MR read head 108, thereby accounting for physical geometric variations in the MR stripe and for variations in operating temperatures, thereby significantly improving the overall performance of the MR read heads in DASD 100.

TEST RESULTS

In order to implement the present invention, it is necessary to determine the resistance of the MR head element for at least two distinct bias supply levels. The first or initial bias supply level should ideally be selected to be a fairly low level (i.e. 1.0 mA) to establish the "no heating" resistance of the MR head element. Minimizing the heating in the MR head element for the low bias current resistance measurement simplifies the calculation and maintains a more desirable level of accuracy. The very low current level is easily supplied in a laboratory environment but is generally not available in a typical commercial DASD unit. However, as explained below, this should not prove to be an impediment to implementing the invention. Also, it is anticipated that future commercial embodiments of DASD units will include the capability of supplying very low levels of bias current. The second bias supply level is some bias level greater than the "no heating" bias level. It has been empirically determined that the resistance ratio which most closely approximates the ideal maximum allowable temperature rise in the MR head element is 1.138. This ratio reflects a 13.8% increase in resistance using the known temperature coefficient of the MR head element.

Table I below shows the ratio between the MR head element resistance at the indicated level of bias current and the resistance at the "no heating" level or the level of heating generated by a very low current level (i.e., 1.0 mA). The lower eight bias current levels shown have been chosen because they correspond to the bias current supply levels available on certain DASDs which are presently available. The two highest current levels are additional incremental intervals which may be added to commercial DASD units in the future. However, it should be noted that the current levels illustrated in Table I below are not exclusive and are not limitations on the present invention. Similar empirical calculations can be made at other current levels and the present invention is independent of any specific hardware.

TABLE I

| Imr | 5.00 | 6.25 | 7.50 | 8.75 | 10.00 | 11.25 | 12.50 | 13.75 | 15.00 | 16.25 |
|---|---|---|---|---|---|---|---|---|---|---|
| HD1 $R/R_{01}$ | 1.061 | 1.096 | 1.138 | 1.188 | 1.245 | 1.311 | approaching burn out | | | |
| HD2 $R/R_{02}$ | 1.027 | 1.043 | 1.061 | 1.083 | 1.109 | 1.138 | 1.170 | 1.206 | 1.245 | 1.288 |
| HD3 $R/R_{03}$ | 1.015 | 1.024 | 1.035 | 1.047 | 1.061 | 1.078 | 1.096 | 1.116 | 1.138 | 1.162 |

Table I shows that the maximum bias current for HD1 should be set at 7.50 mA, the maximum bias current for HD2 should be set at 11.25 mA, and the maximum bias current for HD3 should be set at 15.0 mA. These bias current supply levels will maximize the performance of the respective MR read heads without degrading the overall lifetime of the respective MR read heads due to excessive temperature levels. If all of these MR read heads were located in the same DASD unit and the bias supply were set to the lowest level of bias current acceptable to all of the MR read heads (i.e., 7.50 mA for HD1), then HD2 and HD3 would be operating at bias current levels significantly below their allowable levels. This, in turn, means that the performance of the DASD unit will be unnecessarily limited. If, on the other hand, the bias supply were set to provide the optimal bias current for HD3 (i.e., 15.0 mA), then HD1 and HD2 would most likely suffer premature failure due to excessive temperature levels. By approximating the maximum temperature for each MR head element using the resistance ratio, the optimal bias current for the individual MR read heads can be selected.

In the case where the lowest available bias current causes more than negligible heating in the MR head, the method of the present invention can still be used. Again referring to HD1 in Table I, assume that the low bias current level is 5.0 mA. The resistance in HD1 is 1.061 times the "no heating" resistance value. When measuring the resistance of HD1 at 7.50 mA, the resistance is 1.138 times the "no heating" resistance value. The ratio of the resistances at 7.50 mA compared to the resistance at 5.0 mA is 1.138/1.061=1.073. Therefore, if the ratio of the resistance of an MR head measured at 7.50 mA compared to the resistance of the same MR head at 5.0 mA is less than 1.073, then the optimum bias level is above 7.50 mA (but not necessarily 8.75 mA which is the next available increment). For example, at 7.50 mA, HD2 would have a ratio of 1.061/1.027=1.033. For HD3, the ratio would be 1.035/1.015=1.020 which is even lower the ratio for HD2. Again, looking at Table I, HD 2 has an optimum bias level of 11.25 mA. If the resistance at 11.25 mA is compared to the resistance at 5.0 mA, the ratio would be 1.138/1.027=1.108. Therefore, using the resistance levels measured at 11.25 mA level and the 5.0 mA level, the optimum ratio is 1.108. Now consider HD1 tested at 11.25 mA and 5.0 mA. HD1 would have a ratio of 1.311/1.061= 1.236, which is far above the optimum ratio of 1.108. This means that the temperature of MR stripe in HD1 is much higher than the desired levels and the lifespan of HD1 may be unnecessarily shortened. Consider the resistance of HD3 measured at 11.25 mA and 5.0 mA. The resistance ratio would be 1.078/1.015=1.062 which is below the optimum ratio of 1.108, indicating that more heating is allowed without unnecessarily shortening the lifespan of HD3. In a similar manner, the optimum ratio for each pair of currents shown in Table I can be calculated and tabulated for use in the method of the present invention as shown in FIG.4

One other important feature of the present invention is that it eliminates error due to inexact bias supply sources. For example, suppose that an MR head exhibits the desired resistance ratio of 1.138 at a true bias current value of 10.0 mA. However, further suppose that the given bias supply source has a larger than normal error in the nominal bias supply level versus actual bias supply level and that the actual supplied bias level was only 8/9 of the correct value or 11.1% lower than that selected. When the voltages were correctly measured, using an accurate measuring device, the calculated resistances would all appear to be low, compared to the voltage levels calculated using the assumed currents. However, the resistance ratios would not change. The only difference would be that the circuit would select the 11.25 mA as the correct level of bias current to achieve the desired resistance ratio of 1.138. Therefore, although the correct current should have been 10 mA, the actual current setting selected by the resistance ratio method of the present invention finds the proper current, even though the indicated current is incorrect. In this case, since the indicated current of 11.25 mA is actually 10.0 mA, the correct current value is supplied by the bias supply source. This advantage is possible because, for the most part, errors in the current source within a given DASD module track each other.

While the example above shows how the method of the present invention can be used with a laboratory supplied 1.0 mA bias current, very low current levels are not typically available inside currently manufactured DASD units. While future designs may include the capability of supplying bias currents at these lower levels, implementing the present invention with currently available DASD units is desirable.

An additional application of the present invention can be used to statistically increase the projected overall lifespan for an entire population of DASD products. Using the present invention, most of the MR heads in a given DASD unit will be operating near the maximum acceptable bias levels. Since the electromigration failure with temperature is a somewhat statistical process, it may be possible that the failure rate for a population of DASDs would increase if the present invention were used. While possible, any negative implications can be considered and eliminated by using the present invention.

Because MR head lifespan is closely related to the temperature of the MR head, reducing the temperature of the MR head can increase the lifespan of an MR head. If the bias level for each MR read head with acceptable error rate performance is set to a slightly lower bias level than the theoretical maximum optimal bias level, the overall expected lifespan of the DASD unit can be extended.

The error rate for each individual MR head is dependant on many factors other than MR stripe physical geometry. These factors include the quality of the magnetic recording media, the distance between the MR heads and the magnetic media, ambient temperature of the DASD, etc. Because of these other differences, the error rates for the different MR head/disk combinations in a given DASD unit will vary significantly even at optimal MR head bias levels. Typically, only a few of the MR head/disk combinations in a given population have unacceptable error rates and need to be pushed to the maximum bias levels. Most of the MR head/disk combinations in a DASD unit will have far better error rates than necessary to achieve acceptable performance. Since the average error rate of a DASD unit is usually dominated by one poor performing MR head/disk combination, only those MR heads that exhibit unacceptably poor error rates need to be biased at the maximum possible bias levels. Biasing the MR head/disk combinations that already exhibit acceptable error rates with a bias level that is slightly less than maximum bias level for optimal performance will not adversely degrade the overall DASD error rate significantly and can statistically improve the probability of increased lifespan for the DASD unit.

For example, the bias current for an MR head with an acceptable error rate might be set about 10% lower than the maximum acceptable bias current value. The resulting temperature rise would be about 20% less than the maximum allowable temperature rise for the MR head at the higher bias current level and the lifespan of the MR head would be approximately 1 order of magnitude longer. The data error rate would be approximately 1 order of magnitude worse than the data error rate at the maximum acceptable level of bias current. However, most MR head/disk combinations will still be able meet design performance criteria, even with this order of degradation. For MR heads that have even better error rates, the bias current could be reduced 20%. This would lengthen lifespan expectancy by approximately two orders of magnitude and the data error rate would be approximately 2 orders of magnitude worse than the data error rate at the maximum acceptable level of bias current. Although possible, it would not be necessary to decrease the bias current any further because the odds of thermal failure beyond this point are negligible. The method of the present invention allows the bias current to be determined and then adjusted to achieve both better MR head performance and longer overall lifespan.

While the invention has been particularly shown and described with reference to preferred embodiments thereof, it will be understood by those skilled in the art that various changes in form and details may be made therein without departing from the spirit and scope of the invention.

I claim:

1. A direct access storage device (DASD) comprising:
   at least one magnetoresistive transducer head coupled to a bias supply; and
   a circuit for adaptively controlling the bias supply, the circuit comprising:
      an adjustable bias supply source;
      a monitoring circuit capable of tracking the voltage-current (VI) characteristics of the magnetoresistive head;
      a resistance ratio calculation circuit coupled to the monitoring circuit that controls the output level of the adjustable bias supply source according to the resistance ratio of the magnetoresistive head at different levels of bias supply as determined by the VI characteristics of the magnetoresistive head.

2. The device of claim 1 wherein the adjustable bias supply source supplies a bias current derived from a plurality of input currents.

3. The device of claim 1 wherein the adjustable bias supply source is controlled by an analog circuit that supplies a continuously variable bias current.

4. The device of claim 1 wherein the adjustable bias supply source is a current source and the monitoring circuit monitors the voltage level across the magnetoresistive head.

5. The device of claim 1 wherein the adjustable bias supply source is a variable voltage source and the monitoring circuit monitors the current passing through the magnetoresistive head.

6. A method of adaptively controlling a bias supply source for a magnetoresistive read head, the method comprising the steps of:
   determining the resistance of the magnetoresistive read head at a low bias supply level;
   determining the resistance of the magnetoresistive read head at a high bias supply level;
   calculating the resistance ratio of the low bias supply level resistance and the high bias supply level resistance; and,
   adjusting the bias supply source level until the resistance ratio equals some pre-determined resistance ratio.

7. The method of claim 6 wherein the pre-determined resistance ratio is 1.138.

8. The method of claim 6 wherein the bias supply source supplies a bias current derived from a plurality of input currents.

9. The method of claim 6 wherein the bias supply source comprises an adjustable voltage supply.

10. The method of claim 8 wherein the bias current is maintained below a certain current level thereby ensuring that the temperature of the magnetoresistive read head does not exceed a predetermined temperature threshold level.

11. The method of claim 10 wherein the pre-determined temperature threshold level is 155° C.

12. In a magnetic data storage device having data recorded in tracks on a media surface and including at least one magnetoresistive read head, a method of controlling a bias supply source for the magnetoresistive read head, the method comprising the steps of:
   determining the resistance of the magnetoresistive read head at a low bias supply level;
   determining the resistance of the magnetoresistive read head at a high bias supply level;
   calculating the resistance ratio between the low bias supply level resistance and the high bias supply level resistance;
   adjusting the bias supply source level to an optimal bias supply value that achieves a pre-determined desired resistance ratio between the resistance of the magnetoresistive read head at the high bias supply level and the resistance of the magnetoresistive read head at the low bias supply level; and,
   supplying the optimal bias supply to the magnetoresistive head in accordance with the optimal bias supply value.

13. The method of claim 12 where the pre-determined desired resistance ratio is 1.138.

14. The method of claim 12, further comprising the step of storing the optimal bias supply value in a non-volatile memory device.

15. The method of claim 12 wherein the bias supply source supplies a bias current derived from a plurality of input currents.

16. The method of claim 12 wherein the bias supply source is an adjustable voltage source.

17. The method of claim 15 wherein the bias current supplied by the bias supply source is maintained below a certain current level thereby ensuring that the temperature of the magnetoresistive read head does not exceed a pre-determined threshold level.

18. The method of claim 17 wherein the pre-determined threshold is 155° C.

19. The method of claim 12 wherein the adjustable bias supply source is controlled by an analog circuit that supplies a continuously variable bias current.

20. A method of controlling a bias supply source for a family of magnetoresistive read heads, the method comprising the steps of:
   characterizing the magnetoresistive read head family by plotting the lifetime versus the temperature;
   determining the maximum bias current possible for the magnetoresistive read head family based on the resistance ratio of the MR head at different bias levels that is desirable without prematurely degrading head life; and,
   supplying a circuit that provides the maximum allowable bias current for the magnetoresistive read head family considering the resistance ratio and head family lifetime.

21. A method for setting an individual bias supply level for each of a plurality of magnetoresistive heads in a DASD, the method comprising the steps of:
   (a) selecting a magnetoresistive head that is one of the plurality of magnetoresistive heads;
   (b) selecting a low bias supply level;
   (c) determining the resistance of the magnetoresistive head at the low bias supply level;
   (d) selecting a bias supply level that is higher than the low bias supply level of step (c);
   (e) determining the resistance of the magnetoresistive head at the new bias supply level;
   (f) calculating a resistance ratio (the ratio of the resistance of the magnetoresistive head at the new bias level to the resistance of the magnetoresistive head at the low bias level);
   (g) comparing the calculated resistance ratio to a desired resistance ratio;
   (h) selecting a new bias supply level that is incrementally higher if the calculated resistance ratio is greater than the desired resistance ratio and incrementally lower if the calculated resistance ratio is less than the desired resistance ratio;

(i) repeating steps (e) through (h) until the calculated resistance ratio and the desired resistance ratio are the same;

(j) setting the individual bias supply level for the magnetoresistive head to the bias supply level as determined by steps (e) through (i); and (k) repeating steps (a) through (j) for each of the remaining magnetoresistive heads.

22. A method for setting an individual bias supply level for a magnetoresistive head in a DASD, the method comprising the steps of:

(a) selecting a magnetoresistive head within the DASD that has an unacceptable error rate;

(b) selecting a low bias supply level;

(c) determining the resistance of the magnetoresistive head at the low bias supply level;

(d) selecting a bias supply level that is higher than the low bias supply level of step (c);

(e) determining the resistance of the magnetoresistive head at the new bias supply level;

(f) calculating a resistance ratio (the ratio of the resistance of the magnetoresistive head at the new bias level to the resistance of the magnetoresistive head at the low bias level);

(g) comparing the calculated resistance ratio to a desired resistance ratio;

(h) selecting a new bias supply level that is incrementally higher if the calculated resistance ratio is greater than the desired resistance ratio and incrementally lower if the calculated resistance ratio is less than the desired resistance ratio;

(i) repeating steps (e) through (h) until the calculated resistance ratio and the desired resistance ratio are the same;

(j) setting the individual bias supply level for the magnetoresistive head to the bias supply level as determined by steps (e) through (i); and (k) repeating steps (a) through (j) for each of the remaining magnetoresistive heads in the DASD that have unacceptable error rates.

23. A method for setting an individual bias supply level for a magnetoresistive head in a DASD to extend the life of the magnetoresistive head without unnecessarily degrading performance of the DASD, the method comprising the steps of:

(a) selecting a magnetoresistive head within the DASD that has a better than acceptable error rate;

(b) selecting a low bias supply level and supplying the low bias level to the magnetoresistive head;

(c) determining the resistance of the magnetoresistive head at the low bias supply level;

(d) selecting a bias supply level that is higher than the low bias supply level of step (c) and supplying the higher bias level to the magnetoresistive head;

(e) determining the resistance of the magnetoresistive head at the new bias supply level;

(f) calculating a resistance ratio (the ratio of the resistance of the magnetoresistive head at the new bias level to the resistance of the magnetoresistive head at the low bias level);

(g) comparing the calculated resistance ratio to a desired resistance ratio;

(h) selecting a new bias supply level that is incrementally higher if the calculated resistance ratio is greater than the desired resistance ratio and incrementally lower if the calculated resistance ratio is less than the desired resistance ratio;

(i) repeating steps (e) through (h) until the calculated resistance ratio and the desired resistance ratio are the same;

(j) setting the individual bias supply level for the magnetoresistive head to a bias level that is a certain percentage less than determined by steps (e) through (i); and (k) repeating steps (a) through (j) for each of the remaining magnetoresistive heads in the DASD that have better than acceptable error rates.

24. The method of claim 23 wherein the certain percentage is 10%.

25. The method of claim 23 wherein the certain percentage is 20%.

* * * * *